Figure 1:
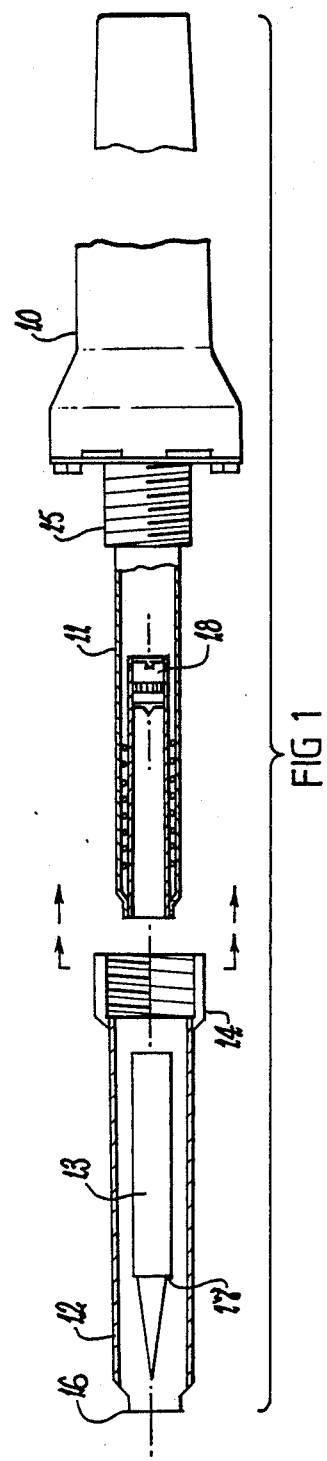

United States Patent [19]

Royston et al.

[11] Patent Number: 4,903,884
[45] Date of Patent: Feb. 27, 1990

[54] SOLDERING APPARATUS

[75] Inventors: Lindsay I. Royston, Mount Waverley; Ian M. Eastham, Blackburn South, both of Australia

[73] Assignee: Royel International Pty. Ltd., Notting Hill, Australia

[21] Appl. No.: 284,257

[22] Filed: Dec. 14, 1988

[30] Foreign Application Priority Data

Dec. 17, 1987 [AU] Australia ................. PI5967

[51] Int. Cl.⁴ ............................................. B23K 3/02
[52] U.S. Cl. ...................................... 228/51; 228/55; 219/230; 174/51
[58] Field of Search ............... 228/51, 55; 219/85 D, 219/230, 231, 234; 174/2, 51, 78

[56] References Cited

U.S. PATENT DOCUMENTS

| 3,111,101 | 11/1963 | Boggs, Sr. et al. | 228/55 |
| 3,236,932 | 2/1966 | Grigas et al. | 174/2 |
| 3,435,126 | 3/1969 | Hamilton | 174/78 |
| 3,904,932 | 9/1975 | Langlie et al. | 174/2 |
| 4,086,465 | 4/1978 | Sylvester | 228/55 |
| 4,322,773 | 3/1982 | Bordner | 174/51 |
| 4,473,714 | 9/1984 | Brownell et al. | 174/78 |

FOREIGN PATENT DOCUMENTS 520814  3/1931  Fed. Rep. of Germany ........ 228/51

Primary Examiner—Nicholas P. Godici
Assistant Examiner—Samuel M. Heinrich
Attorney, Agent, or Firm—Merchant, Gould, Smith, Edell, Welter & Schmidt

[57] ABSTRACT

Soldering apparatus of the kind having a replaceable tip element including a soldering face and having a frame portion and a tip retaining portion adapted to retain the tip element in heat conducting relationship with the frame portion. The soldering apparatus is characterized in that the frame portion incorporates a contact assisting formation adapted to embed itself at least partly into the tip element remote from the soldering face to thereby reduce electrical resistance between the tip element and frame.

9 Claims, 1 Drawing Sheet

U.S. Patent  Feb. 27, 1990  4,903,884

SOLDERING APPARATUS

The present invention relates to soldering apparatus.

Increasing miniaturisation of electronic components and associated increases in operating speeds and component numbers has rendered such components increasingly susceptible to damage by extraneous electrical influences including electrostatic charge, induced current by capacitance, leakage current from mains supply, switching current in temperature controlled soldering tools, mains supply transients etc.

Much research has been devoted to the design of soldering tools and associated power supply units to isolate the soldering tip element from extraneous electrical influences. Developments to this end include screening the power supply with Faraday shields, switching the power supply at zero-cross over, incorporating static electricity dissipating materials in handles and power cords, and improving grounding of the soldering tool frame.

One area of difficulty has been in the grounding of replaceable tips of soldering tools. This difficulty is due mainly to the corrosive effects of soldering flux fumes as they condense on the barrel of the soldering tool and the interface between the soldering tip and barrel parts. Build up of corrosive materials on these parts tends to insulate the tip electrically from the barrel with consequent increase in electrical resistance from the soldering face of the tip element to ground.

State-of-the-art replaceable soldering tips elements are typically held in the barrel by a threaded nut adjacent the handle of the soldering tool, i.e. away as far as possible from heated parts and soldering flux fumes. However the tip/barrel interface cannot be sufficiently separated or removed from the area of heat and corrosive fumes. Thus some corrosive material still finds its way to the point of contact between the frame of the soldering tool and the soldering tip element.

Earlier methods of securing the soldering tip element by means of a laterally threaded screw impinging on the shank of the tip element, caused damage to the protective coating or plating of the tip element, allowing the penetration of flux fumes, rapid oxidation and seizing or freezing of the tip element in the barrel of the soldering tool. In addition, it reduced the thermal contact area of the tip element with the heated barrel, thus reducing the operating efficiency of the soldering tool.

An object of the present invention is to provide soldering apparatus having improved electrical contact between the frame of the apparatus and the tip element.

The arrangement of the present invention preferably is such that it may be provided remote from the soldering face of the tip element to minimize infusion of corrosive fumes and residue.

The improved contact of the present invention may be particularly suitable for use with soldering tools in which the replaceable tip element is held in the barrel of the tool by rearward compression. Compression forces may be applied via the barrel to a flange adjacent the soldering face of the tip element. The tip end of the barrel may include a reduced diameter portion for engaging the flange.

Improved electrical contact between the frame of a soldering tool and the tip element may be achieved by providing a contact assisting formation with or on that portion of the frame which engages the tip element. The contact assisting formation may be raised so that it may embed itself at least partly in the relatively softer material of the tip element.

The raised formation may include a spike or spikes formed integrally with or attached to that portion of the frame which engages the tip element. In one form the raised formation may comprise a conical or pyramidal spike formed on the frame such that it penetrates the protective coating or plating applied to the tip element and engages the rear face of the shank of the tip element remote from the soldering face approximately at its center. In another form the contact assisting formation may include a knife edge portion or portions. The knife edge portions may be cruciform. According to a still further embodiment the contact assisting formation may include spikes, knife-edges or other sharp formation or formations adapted to engage the shank of the tip element laterally rather than from the rear.

The contact assisting formation may comprise steel or other relatively hard material which is capable of embedding itself in the relatively softer material of the shank of the tip element to thereby make good electrical contact therewith.

In one form the contact assisting formation may comprise an insert or plug. The insert or plug may comprise a substantially cylindrical element. The insert or plug may be attached to the frame of the soldering apparatus by means of a press or interference fit or it may be fixed to the frame by welding or brazing, for example.

The frame carrying the contact assisting formation may be electrically connected to ground to promote a very low voltage potential (less than approximately 2 mV R.M.S.) between the soldering face of the tip element and ground even during extended soldering operations.

Alternatively the insert or plug may be arranged to extend into the handle of the soldering apparatus and may be hard wired to ground.

According to the present invention, there is provided soldering apparatus of the kind having a replaceable tip element including a soldering face and having a frame portion and a tip retaining portion adapted to retain said tip element in heat conducting relationship with said frame portion; characterized in that said frame portion incorporates a contact assisting formation adapted to embed itself at least partly into the tip element remote from said soldering face to thereby reduce electrical resistance between said tip element and said frame.

Figure 2:
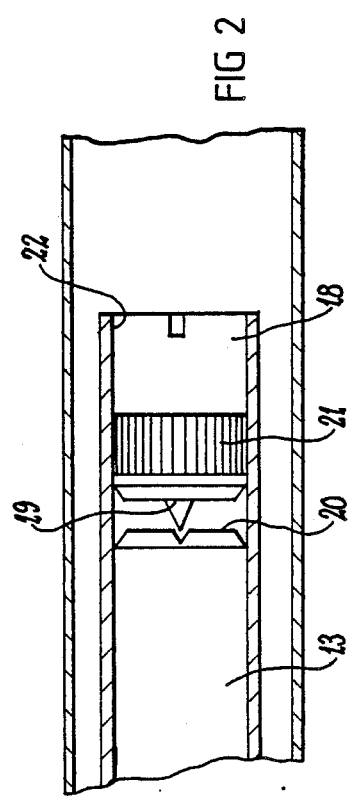

A preferred embodiment of the present invention will now be described with reference to the accompanying drawing wherein:

FIG. 1 shows a partly cut-away view of a soldering tool incorporating the improved ground contacting formation of the present invention; and FIG. 2 shows an enlarged view of the formation embedded in the shank of the tip element remote from the soldering face.

Referring to FIG. 1 there is shown a soldering tool including handle portion 10, frame portion 11, barrel cover 12 and tip 13. Barrel cover 12 holds tip element 13 within frame 11 by rearward compression. Barrel 12 includes a threaded base 14 which engages threaded portion 15 of frame 11. Barrel 12 includes a reduced diameter portion 16 which engages flange 17 of tip element 13.

Frame 11 includes a metal insert plug 18. Plug 18 has a conical spike formation 19. Spike formation 19 is adapted to embed itself in the rear face 20 of the shank of tip element 13 (refer FIG. 2). Plug 18 is substantially cylindrical and includes a fluted region 21 around its circumference. Fluted region 21 is adapted to provide a tight interference fit between insert plug 18 and frame 11. Fluted region 21 is adapted to firmly engage the side wall of cylindrical recess 22 in frame 11 to provide good electrical contact therebetween.

Insert plug 18 may be any convenient length. The length of insert plug 18 will in general depend on the length of the shank of the tip element 13.

Frame 11 and/or insert plug 18 is/are electrically connected to ground potential. Conical spike formation 19 promotes a very low resistance (less than approximately 2 ohms) between the soldering face of tip element 13 and ground even during extended soldering operations.

The soldering apparatus of the present invention preferably is operated via electric power having a relatively low voltage, e.g. less than 30 volts. A ground terminal of the electric power supply may be connectable to the frame portion of the soldering apparatus.

It will be appreciated that various alterations, modifications and/or additions may be introduced into the constructions and arrangements of parts previously described without departing from the spirit or ambit of the invention.

We claim:

1. Soldering apparatus of the kind having a replaceable tip element, the tip element being elongate and having a first end which defines a soldering face and a second end remote from the first end, the apparatus further comprising an elongate, tubular frame assembly in which the tip element is held such that the first end of the tip element projects beyond an end of said assembly; the frame assembly including:
   (a) an inner frame portion which defines an elongate bore in which the second end of the tip element is longitudinally received;
   (b) an outer frame retaining portion received on the inner frame portion, and adapted to retain the tip element in heat conducting relationship with the inner frame portion; and
   (c) a contact assisting member within the bore of said inner frame portion, said member having a body portion which provides a relatively low electrical resistance between said contact assisting member and said inner frame portion, and a contact assisting formation on said body portion adapted to embed itself at least partially into the tip element adjacent said second end;

wherein said outer retaining portion is retained in assembly with the inner frame portion such that the tip element is retained in heat conducting relationship with the inner frame portion and such that said contact formation of the contact assisting member is caused to embed itself at least partially within said tip element adjacent said second end to promote a relatively low electrical resistance between said tip element and said inner frame portion.

2. Soldering apparatus according to claim 1 wherein said tip element comprises a core and a protective coating applied to said core, said contact assisting formation being adapted to penetrate said coating.

3. Soldering apparatus according to claim 1 wherein said contact assisting formation comprises a conical spike.

4. Soldering apparatus as claimed in claim 1 wherein said tip element includes an elongate shank and wherein said formation is adapted to embed itself in a rear face of said shank at said second end of said tip element.

5. Soldering apparatus as claimed in claim 1 wherein said contact assisting formation is provided on an insert held in said frame.

6. Soldering apparatus as claimed in claim 5 wherein said insert comprises a substantially cylindrical body portion.

7. Soldering apparatus as claimed in claim 6 wherein said contact assisting formation comprises a conical spike formed with said insert.

8. Soldering apparatus as claimed in claim 6 wherein said insert includes a fluted region around its body portion circumference adapted to provide a tight interference fit between said insert and said frame portion.

9. Soldering apparatus of the kind having a replaceable tip element including a soldering face, and having a frame portion and a tip retaining portion adapted to retain said tip element in heat conducting relationship with said frame portion; characterized in that said frame portion incorporates a contact assisting formation adapted to embed itself at least partly into the tip element remote from said soldering face to promote a relatively low electrical resistance between said tip element and said frame; wherein said contact assisting formation is provided on an insert held in said frame, and said insert comprises a substantially cylindrical element and a fluted region around its circumstance adapted to provide a tight interference fit between said insert and said frame.

* * * * *

UNITED STATES PATENT AND TRADEMARK OFFICE
CERTIFICATE OF CORRECTION

PATENT NO.  : 4,903,884

DATED       : 27 February 1990

INVENTOR(S) : Lindsay I. Royston, Ian M. Eastham

It is certified that error appears in the above-identified patent and that said Letters Patent is hereby corrected as shown below:

Col. 4, line 46 "circumstance" should be --circumference--.

Signed and Sealed this

Twenty-seventh Day of August, 1991

Attest:

HARRY F. MANBECK, JR.

*Attesting Officer*          *Commissioner of Patents and Trademarks*